United States Patent
Liu et al.

(10) Patent No.: US 11,512,172 B2
(45) Date of Patent: Nov. 29, 2022

(54) RADOME SUBSTRATE AND PREPARATION METHOD THEREOF

(71) Applicant: KUANG-CHI CUTTING EDGE TECHNOLOGY LTD., Shenzhen (CN)

(72) Inventors: Ruopeng Liu, Shenzhen (CN); Zhiya Zhao, Shenzhen (CN); Maobiao Yuan, Shenzhen (CN)

(73) Assignee: Kuang-Chi Cutting Edge Technology Ltd., Guangdong (CN)

( * ) Notice: Subject to any disclaimer, the term of this patent is extended or adjusted under 35 U.S.C. 154(b) by 242 days.

(21) Appl. No.: 16/910,797

(22) Filed: Jun. 24, 2020

(65) Prior Publication Data

US 2020/0332075 A1    Oct. 22, 2020

Related U.S. Application Data

(63) Continuation of application No. PCT/CN2018/079867, filed on Mar. 21, 2018.

(30) Foreign Application Priority Data

Dec. 26, 2017   (CN) .......................... 201711435107.9

(51) Int. Cl.
| | | |
|---|---|---|
| C08J 3/22 | (2006.01) | |
| C08K 3/34 | (2006.01) | |
| C08K 7/28 | (2006.01) | |
| C08K 9/06 | (2006.01) | |
| C08L 51/08 | (2006.01) | |
| C08L 71/12 | (2006.01) | |

(52) U.S. Cl.
CPC .............. *C08J 3/226* (2013.01); *C08K 3/346* (2013.01); *C08K 7/28* (2013.01); *C08K 9/06* (2013.01); *C08L 51/08* (2013.01); *C08L 71/12* (2013.01); *C08J 2371/12* (2013.01); *C08J 2451/08* (2013.01); *C08J 2471/12* (2013.01)

(58) Field of Classification Search
CPC .... C08J 3/226; C08J 2321/12; C08J 2451/08; C08J 2471/12; C08K 3/346; C08K 7/28; C08K 9/06; C08L 51/08; C08L 71/12
See application file for complete search history.

(56) References Cited

FOREIGN PATENT DOCUMENTS

| | | |
|---|---|---|
| CN | 103625063 A | 3/2014 |
| CN | 106893303 A | 6/2017 |
| CN | 107459805 A | 12/2017 |
| JP | 2005200562 A | 7/2005 |
| JP | 2011116870 A | 6/2011 |
| KR | 20090097031 A | 9/2009 |

OTHER PUBLICATIONS

Machine translation of CN 106893303 (Year: 2017).*
International Search Report for corresponding International Application No. PCT/CN2018/079867, dated Sep. 17, 2018, 3 pages.

* cited by examiner

*Primary Examiner* — Edward J Cain
(74) *Attorney, Agent, or Firm* — Armstrong Teasdale LLP

(57) ABSTRACT

The present invention provides a radome substrate and a preparation method thereof. The radome substrate includes: 5 to 10 parts of polyphenylene ether resin, 70 to 85 parts of ceramic masterbatch, 10 to 15 parts of hollow microbead masterbatch, 1 to 3 parts of a compatibilizer, and 0.1 to 0.3 parts of a lubricant. The radome substrate prepared according to the method provided in the present invention has a high dielectric constant and stress cracking resistance performance.

20 Claims, 1 Drawing Sheet

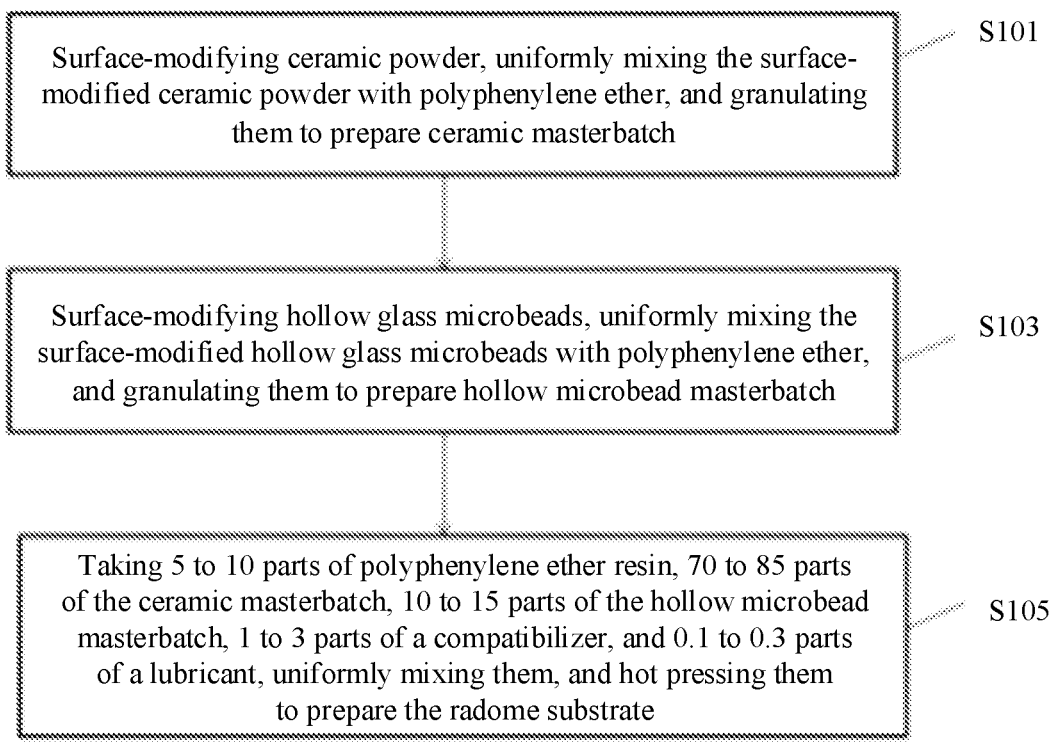

RADOME SUBSTRATE AND PREPARATION METHOD THEREOF

CROSS-REFERENCE TO RELATED APPLICATIONS

The present application is a continuation of International Patent Application No. PCT/CN2018/079867, filed on Mar. 21, 2018, and claims priority to Chinese patent Application No. 201711435107.9, filed on Dec. 26, 2017, the contents of which are hereby incorporated by reference in their entirety.

TECHNICAL FIELD

The present invention relates to a radome, and more particularly, to a radome substrate and a preparation method thereof.

BACKGROUND

Currently, radome substrates used on the market mainly include polytetrafluoroethylene (PTFE), polyimide (PI), etc. Such materials have high rigidity, high heat deformation temperature, and excellent electrical performance. However, material and processing costs of polytetrafluoroethylene and polyimide are high, and a processing temperature range of the polytetrafluoroethylene is narrow. In addition, the molecular structure of polyphenylene ether is rigid, and the products are prone to stress cracking, which is not suitable for secondary thermal processing.

In the prior art, although polyphenylene ether substrates can also be used to manufacture radome substrates, there is no mention of stress cracking of polyphenylene ether resin and corresponding solutions. The radome substrate manufactured according to the prior art has obvious local cracks during the secondary thermal processing.

SUMMARY

In order to overcome the disadvantage of the prior art, the present invention provides a radome substrate and a preparation method thereof.

According to one aspect of the present invention, a radome substrate includes, based on parts by weight:

5 to 10 parts of polyphenylene ether resin, 70 to 85 parts of ceramic masterbatch, 10 to 15 parts of hollow microbead masterbatch, 1 to 3 parts of a compatibilizer, and 0.1 to 0.3 parts of a lubricant.

In the above radome substrate, the ceramic masterbatch is obtained by surface-modifying ceramic powder with a coupling agent, mixing the surface-modified ceramic powder with polyphenylene ether, and granulating them; and the ceramic powder comprises one or a combination of rutile $TiO_2$, $BaO_6SrTi_2$, $SrTiO_3$, $BaTiO_3$, and $CaCu_3Ti_4O_{12}$.

In the above radome substrate, the hollow microbead masterbatch is obtained by surface-modifying hollow glass microbeads with a coupling agent, mixing the surface-modified hollow glass microbeads with polyphenylene ether, and granulating them.

In the above radome substrate, the coupling agent comprises one or a combination of γ-aminopropyltriethoxysilane, γ-(2,3-epoxypropoxy), and propyl trimethoxy silane.

In the above radome substrate, the compatibilizer comprises one or a combination of polyphenylene oxide grafted maleic anhydride (PPO-g-MAH) and polyphenylene oxide grafted glycidyl methacrylate (PPO-g-GMA), and a grafting rate of each of the polyphenylene-oxide-grafted-maleic-anhydride and the polyphenylene oxide grafted glycidyl methacrylate is 0.5%-1.0%.

In the above radome substrate, the lubricant comprises one or a combination of glyceryl monostearate, N,N'-ethylene hisstearamide, ethylene bis-stearamide, ethylene stearamide, and polysiloxane.

According to another aspect of the present invention, a preparation method of the above radome substrate, comprises:

surface-modifying ceramic powder, uniformly mixing the surface-modified ceramic powder with polyphenylene ether, and granulating them to prepare ceramic masterbatch;

surface-modifying hollow glass microbeads, uniformly mixing the surface-modified hollow glass microbeads with polyphenylene ether, and granulating them to prepare hollow microbead masterbatch; and based on parts by weight, taking 5 to 10 parts of polyphenylene ether resin, 70 to 85 parts of the ceramic masterbatch, 10 to 15 parts of the hollow microbead masterbatch, 1 to 3 parts of a compatibilizer, and 0.1 to 0.3 parts of a lubricant, uniformly mixing them, and hot pressing them to prepare the radome substrate.

In the above preparation method of the radome substrate, wherein in the step of preparing the ceramic masterbatch, using a coupling agent whose weight accounts for 0.3% to 0.5% of a total weight of the ceramic masterbatch to surface-modify the ceramic powder, wherein weights of the surface-modified ceramic powder and the polyphenylene ether respectively account for 80% to 85% and 10% to 20% of the total weight of the ceramic masterbatch; and in the step of preparing the hollow microbead masterbatch, using a coupling agent whose weight accounts for 0.3% to 0.5% of a total weight of the hollow microbead masterbatch to surface-modify the hollow glass microbeads, wherein weights of the surface-modified hollow glass microbeads and the polyphenylene ether respectively account for 50% to 55% and 45% to 55% of the total weight of the hollow microbead masterbatch.

In the above preparation method of the radome substrate, the coupling agent comprises one or a combination of γ-aminopropyltriethoxysilane, γ-(2,3-epoxypropoxy), and propyl trimethoxy silane; the compatibilizer comprises one or a combination of polyphenylene oxide grafted maleic anhydride (PPO-g-MAH) and polyphenylene oxide grafted glycidyl methacrylate (PPO-g-GMA); and the lubricant comprises one or a combination of glyceryl monostearate, N,N'-ethylene hisstearamide, ethylene bis-stearamide, ethylene stearamide, and polysiloxane.

In the above preparation method of the radome substrate, wherein before the step of surface-modifying the ceramic powder, the method further comprises: separately drying the ceramic powder and the polyphenylene ether in an oven at 85° C. to 115° C. for 2 to 3 hours; and before the step of surface-modifying the hollow glass microbeads, the method further comprises: separately drying the hollow glass microbeads and the polyphenylene ether in an oven at 85° C. to 115° C. for 2 to 3 hours;

wherein the hot pressing is performed by a hot press machine, the operating temperature of the hot press machine is 230° C. to 280° C., and the operating pressure of the hot press machine is 20 to 50 MPa.

In order to improve the defect of poor stress resistance of the polyphenylene ether substrate, in the present invention, the ceramic powder is processed by using the coupling agent and then mixed with the polyphenylene ether, so as to prepare the masterbatch. The hollow glass microbeads is processed by using the coupling agent and then mixed with the polyphenylene ether, so as to prepare the masterbatch. And then the compatibilizer is added, so as to improve interface bonding strength between the polyphenylene ether resin, the ceramic masterbatch, and the hollow microbead masterbatch, and improve distribution uniformity of the ceramic powder and the hollow glass microbeads in the polyphenylene ether resin.

Particularly, the compatibilizer includes one or a combination of polyphenylene oxide grafted maleic anhydride (PPO-g-MAH) and polyphenylene oxide grafted glycidyl methacrylate (PPO-g-GMA), which can effectively improve the interface bonding force between polyphenylene ether resin, ceramic masterbatch, and hollow microbead masterbatch. The ratio and content of ceramic powder and hollow glass microbeads are controlled to optimize a stacking and arrangement manner of the ceramic powder and the hollow glass microbeads, which can effectively improve the interface bonding force between polyphenylene ether resin, ceramic powder, and hollow glass microbeads. On the basis of maintaining the density and dielectric constant of the substrate, the defect of stress cracking resistance of the radome substrate manufactured by polyphenylene ether is effectively improved. The present invention provides a lightweight polyphenylene ether radome substrate having high dielectric constant and resistance to stress cracking, which effectively improves stress cracking resistance performance of the polyphenylene ether substrate.

BRIEF DESCRIPTION OF DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a process flowchart of preparing a radome substrate according to an embodiment of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention shall fall within the protection scope of the present invention.

The present invention provides a radome substrate and a preparation method thereof, wherein the preparation method of the radome substrate includes the following steps.

As shown in step S101 in FIG. 1, surface-modifying ceramic powder, uniformly mixing the surface-modified ceramic powder with polyphenylene ether, and granulating them to prepare ceramic masterbatch. Specifically, firstly drying the ceramic powder and the polyphenylene ether in an oven at 85° C. to 115° C. for 2 to 3 hours; and surface-modifying the ceramic powder, uniformly mixing the surface-modified ceramic powder with polyphenylene ether, and granulating them to prepare ceramic masterbatch.

In this step, the ceramic powder is surface-modified by using the coupling agent that accounts for 0.3% to 0.5% of the total weight of the ceramic masterbatch, and weights of the surface-modified ceramic powder and polyphenylene ether account for 80% to 85% and 10% to 20% of the total weight of the ceramic masterbatch respectively. The coupling agent includes one or a combination of γ-aminopropyltriethoxysilane, γ-(2,3-epoxypropoxy), and propyl trimethoxy silane.

As shown in step S103 in FIG. 1, surface-modifying hollow glass microbeads, uniformly mixing the surface-modified hollow glass microbeads with polyphenylene ether, and granulating them to prepare hollow microbead masterbatch. Specifically, firstly drying the hollow glass microbeads and the polyphenylene ether in an oven at 85° C. to 115° C. for 2 to 3 hours; and then surface modifying the hollow glass microbeads, uniformly mixing the surface-modified hollow glass microbeads with the polyphenylene ether, and granulating them to prepare the hollow microbead masterbatch. In this step, the hollow glass microbeads are surface-modified by using the coupling agent that accounts for 0.3% to 0.5% of a total weight of the hollow microbead masterbatch, and weights of the surface-modified hollow glass microbeads and polyphenylene ether account for 50% to 55% and 45% to 55% of the total weight of the hollow microbead masterbatch respectively. The coupling agent includes one or a combination of γ-aminopropyltriethoxysilane, γ-(2,3-epoxypropoxy), and propyl trimethoxy silane.

As shown in step S105 in FIG. 1, based on parts by weight, taking 5 to 10 parts of polyphenylene ether resin, 70 to 85 parts of ceramic masterbatch, 10 to 15 parts of hollow microbead masterbatch, 1 to 3 parts of compatibilizer, and 0.1 to 0.3 parts of lubricant, adding them to a high-speed mixer, uniformly mixing them, and hot pressing them to prepare the radome substrate. The compatibilizer includes one or a combination of polyphenylene oxide grafted maleic anhydride (PPO-g-MAH) and polyphenylene oxide grafted glycidyl methacrylate (PPO-g-GMA), and a grafting rate of each of the polyphenylene-oxide-grafted-maleic-anhydride and the polyphenylene oxide grafted glycidyl methacrylate is 0.5%-1.0%. The lubricant includes one or a combination of glyceryl monostearate, N,N'-ethylene hisstearamide, ethylene bis-stearamide, ethylene stearamide, and polysiloxane. In this step, the hot pressing is performed by a hot press machine, the operating temperature of the hot press machine is 230° C. to 280° C., and the operating pressure of the hot press machine is 20 to 50 MPa.

The following clearly and completely describes the technical solutions in the present invention with reference to specific embodiments.

Embodiment 1

(1) Preparation of Ceramic Masterbatch

Separately drying ceramic powder and polyphenylene ether in an oven at 85° C. for 3 hours, surface-modifying the ceramic powder with the coupling agent (for example γ-aminopropyltriethoxysilane), uniformly mixing the surface-modified ceramic powder with polyphenylene ether, and granulating them by using a granulator to prepare ceramic masterbatch.

Wherein, the ceramic powder is surface-modified by using the coupling agent that accounts for 0.3% of the total weight of the ceramic masterbatch, and weights of the surface-modified ceramic powder and polyphenylene ether account for 80% and 20% of the total weight of the ceramic masterbatch respectively.

(2) Preparation of Hollow Microbead Masterbatch

Separately drying hollow glass microbeads and polyphenylene ether in an oven at 85° C. for 3 hours, surface-modifying the hollow glass microbeads with the coupling agent (for example γ-aminopropyltriethoxysilane), uniformly mixing the surface-modified hollow glass microbeads with polyphenylene ether, and granulating them by using a granulator to prepare hollow microbead masterbatch.

Wherein, the hollow glass microbeads are surface-modified by using the coupling agent that accounts for 0.3% of a total weight of the hollow microbead masterbatch, and weights of the surface-modified hollow glass microbeads and polyphenylene ether account for 50% and 50% of the total weight of the hollow microbead masterbatch respectively.

(3) Preparation of Radome Substrate

Based on parts by weight, taking 5 parts of polyphenylene ether resin, 85 parts of ceramic masterbatch, 10 parts of hollow microbead masterbatch, 1 parts of compatibilizer (for example polyphenylene oxide grafted glycidyl methacrylate (PPO-g-GMA)), and 0.1 parts of lubricant (for example N,N'-ethylene hisstearamide), adding them to a high-speed mixer, uniformly mixing them, and hot pressing them by using a hot press machine to prepare the radome substrate. Wherein, the operating temperature of the hot press machine is 230° C., and the operating pressure of the hot press machine is 20 MPa.

Embodiment 2

(1) Preparation of Ceramic Masterbatch

Separately drying ceramic powder and polyphenylene ether in an oven at 115° C. for 2 hours, surface-modifying the ceramic powder with the coupling agent (for example γ-(2,3-epoxypropoxy)), uniformly mixing the surface-modified ceramic powder with polyphenylene ether, and granulating them by using a granulator to prepare ceramic masterbatch.

Wherein, the ceramic powder is surface-modified by using the coupling agent that accounts for 0.4% of the total weight of the ceramic masterbatch, and weights of the surface-modified ceramic powder and polyphenylene ether account for 85% and 15% of the total weight of the ceramic masterbatch respectively.

(2) Preparation of Hollow Microbead Masterbatch

Separately drying hollow glass microbeads and polyphenylene ether in an oven at 115° C. for 2 hours, surface-modifying the hollow glass microbeads with the coupling agent (for example γ-(2,3-epoxypropoxy)), uniformly mixing the surface-modified hollow glass microbeads with polyphenylene ether, and granulating them by using a granulator to prepare hollow microbead masterbatch.

Wherein, the hollow glass microbeads are surface-modified by using the coupling agent that accounts for 0.4% of a total weight of the hollow microbead masterbatch, and weights of the surface-modified hollow glass microbeads and polyphenylene ether account for 55% and 45% of the total weight of the hollow microbead masterbatch respectively.

(3) Preparation of Radome Substrate

Based on parts by weight, taking 10 parts of polyphenylene ether resin, 70 parts of the ceramic masterbatch, 150 parts of the hollow microbead masterbatch, 3 parts of compatibilizer (for example polyphenylene oxide grafted glycidyl methacrylate (PPO-g-GMA)), and 0.3 parts of lubricant (for example glyceryl monostearate), adding them to a high-speed mixer, uniformly mixing them, and hot pressing them by using a hot press machine to prepare the radome substrate. Wherein, the operating temperature of the hot press machine is 250° C., and the operating pressure of the hot press machine is 30 MPa.

Embodiment 3

(1) Preparation of Ceramic Masterbatch

Separately drying ceramic powder and polyphenylene ether in an oven at 90° C. for 2.5 hours, surface-modifying the ceramic powder with the coupling agent (for example γ-aminopropyltriethoxysilane), uniformly mixing the surface-modified ceramic powder with polyphenylene ether, and granulating them by using a granulator to prepare ceramic masterbatch.

Wherein, the ceramic powder is surface-modified by using the coupling agent that accounts for 0.5% of the total weight of the ceramic masterbatch, and weights of the surface-modified ceramic powder and polyphenylene ether account for 82% and 18% of the total weight of the ceramic masterbatch respectively.

(2) Preparation of Hollow Microbead Masterbatch

Separately drying hollow glass microbeads and polyphenylene ether in an oven at 90° C. for 2.5 hours, surface-modifying the hollow glass microbeads with the coupling agent (for example γ-aminopropyltriethoxysilane), uniformly mixing the surface-modified hollow glass microbeads with polyphenylene ether, and granulating them by using a granulator to prepare hollow microbead masterbatch.

Wherein, the hollow glass microbeads are surface-modified by using the coupling agent that accounts for 0.5% of a total weight of the hollow microbead masterbatch, and weights of the surface-modified hollow glass microbeads and polyphenylene ether account for 45% and 55% of the total weight of the hollow microbead masterbatch respectively.

(3) Preparation of Radome Substrate

Based on parts by weight, taking 5 parts of polyphenylene ether resin, 81 parts of ceramic masterbatch, 13 parts of hollow microbead masterbatch, 1 parts of compatibilizer (for example polyphenylene oxide grafted glycidyl methacrylate (PPO-g-GMA)), and 0.1 parts of lubricant (for example polysiloxane), adding them to a high-speed mixer, uniformly mixing them, and hot pressing them by using a hot press machine to prepare the radome substrate. Wherein, the operating temperature of the hot press machine is 270° C., and the operating pressure of the hot press machine is 50 MPa.

Embodiment 4

(1) Preparation of Ceramic Masterbatch

Separately drying ceramic powder and polyphenylene ether in an oven at 110° C. for 2 hours, surface-modifying the ceramic powder with the coupling agent (for example γ-(2,3-epoxypropoxy)), uniformly mixing the surface-modified ceramic powder with polyphenylene ether, and granulating them by using a granulator to prepare ceramic masterbatch.

Wherein, the ceramic powder is surface-modified by using the coupling agent that accounts for 0.4% of the total weight of the ceramic masterbatch, and weights of the surface-modified ceramic powder and polyphenylene ether account for 83% and 17% of the total weight of the ceramic masterbatch respectively.

(2) Preparation of Hollow Microbead Masterbatch

Separately drying hollow glass microbeads and polyphenylene ether in an oven at 110° C. for 2 hours, surface-modifying the hollow glass microbeads with the coupling agent (for example γ-(2,3-epoxypropoxy)), uniformly mixing the surface-modified hollow glass microbeads with polyphenylene ether, and granulating them by using a granulator to prepare hollow microbead masterbatch.

Wherein, the hollow glass microbeads are surface-modified by using the coupling agent that accounts for 0.4% of a total weight of the hollow microbead masterbatch, and weights of the surface-modified hollow glass microbeads and polyphenylene ether account for 52% and 48% of the total weight of the hollow microbead masterbatch respectively.

(3) Preparation of Radome Substrate

Based on parts by weight, taking 8 parts of polyphenylene ether resin, 77 parts of ceramic masterbatch, 12 parts of hollow microbead masterbatch, 3 parts of compatibilizer (for example polyphenylene oxide grafted glycidyl methacrylate (PPO-g-GMA)), and 0.2 parts of lubricant (for example ethylene stearamide), adding them to a high-speed mixer, uniformly mixing them, and hot pressing them by using a hot press machine to prepare the radome substrate. Wherein, the operating temperature of the hot press machine is 280° C., and the operating pressure of the hot press machine is 40 MPa.

Embodiment 5

(1) Preparation of Ceramic Masterbatch

Separately drying ceramic powder and polyphenylene ether in an oven at 100° C. for 3 hours, surface-modifying the ceramic powder with the coupling agent (for example propyl trimethoxy silane), uniformly mixing the surface-modified ceramic powder with polyphenylene ether, and granulating them by using a granulator to prepare ceramic masterbatch.

Wherein, the ceramic powder is surface-modified by using the coupling agent that accounts for 0.4% of the total weight of the ceramic masterbatch, and weights of the surface-modified ceramic powder and polyphenylene ether account for 83% and 17% of the total weight of the ceramic masterbatch respectively.

(2) Preparation of Hollow Microbead Masterbatch

Separately drying hollow glass microbeads and polyphenylene ether in an oven at 100° C. for 3 hours, surface-modifying the hollow glass microbeads with the coupling agent (for example propyl trimethoxy silane), uniformly mixing the surface-modified hollow glass microbeads with polyphenylene ether, and granulating them by using a granulator to prepare hollow microbead masterbatch.

Wherein, the hollow glass microbeads are surface-modified by using the coupling agent that accounts for 0.4% of a total weight of the hollow microbead masterbatch, and weights of the surface-modified hollow glass microbeads and polyphenylene ether account for 53% and 47% of the total weight of the hollow microbead masterbatch respectively.

(3) Preparation of Radome Substrate

Based on parts by weight, taking 10 parts of polyphenylene ether resin, 79 parts of ceramic masterbatch, 10 parts of hollow microbead masterbatch, 1 parts of compatibilizer (for example polyphenylene oxide grafted glycidyl methacrylate (PPO-g-GMA)), and 0.1 parts of lubricant (for example ethylene bis-stearamide), adding them to a high-speed mixer, uniformly mixing them, and hot pressing them by using a hot press machine to prepare the radome substrate. Wherein the operating temperature of the hot press machine is 240° C., and the operating pressure of the hot press machine is 35 MPa.

Embodiment 6

(1) Preparation of Ceramic Masterbatch

Separately drying ceramic powder and polyphenylene ether in an oven at 88° C. for 2.5 hours, surface-modifying the ceramic powder with the coupling agent (for example propyl trimethoxy silane), uniformly mixing the surface-modified ceramic powder with polyphenylene ether, and granulating them by using a granulator to prepare ceramic masterbatch.

Wherein, the ceramic powder is surface-modified by using the coupling agent that accounts for 0.4% of the total weight of the ceramic masterbatch, and weights of the surface-modified ceramic powder and polyphenylene ether account for 84% and 16% of the total weight of the ceramic masterbatch respectively.

(2) Preparation of Hollow Microbead Masterbatch

Separately drying hollow glass microbeads and polyphenylene ether in an oven at 85° C. for 2.5 hours, surface-modifying the hollow glass microbeads with the coupling agent (for example propyl trimethoxy silane), uniformly mixing the surface-modified hollow glass microbeads with polyphenylene ether, and granulating them by using a granulator to prepare hollow microbead masterbatch.

Wherein, the hollow glass microbeads are surface-modified by using the coupling agent that accounts for 0.5% of a total weight of the hollow microbead masterbatch, and weights of the surface-modified hollow glass microbeads and polyphenylene ether account for 54% and 46% of the total weight of the hollow microbead masterbatch respectively.

(3) Preparation of Radome Substrate

Based on parts by weight, taking 7 parts of polyphenylene ether resin, 75 parts of ceramic masterbatch, 11 parts of hollow microbead masterbatch, 2 parts of compatibilizer (for example polyphenylene oxide grafted glycidyl methacrylate (PPO-g-GMA)), and 0.15 parts of lubricant (for example N,N'-ethylene hisstearamide), adding them to a high-speed mixer, uniformly mixing them, and hot pressing them by using a hot press machine to prepare the radome substrate. wherein the operating temperature of the hot press machine is 260° C., and the operating pressure of the hot press machine is 45 MPa.

It is visually observed whether the radome substrate cracks, and the result shows that the radome substrate prepared in Embodiment 1 to Embodiment 6 does not crack.

On the basis of maintaining substrate density and a dielectric constant, the radome substrate manufactured according to the method provided in the embodiments of the present invention effectively alleviates an stress cracking resistance disadvantage of the radome substrate.

In the present invention, the ceramic powder processed by using the coupling agent and the hollow glass microbeads processed by using the coupling agent each are made into the masterbatches by using the polyphenylene ether, and then the compatibilizer is added, to improve interface bonding strength between the polyphenylene ether resin, the ceramic masterbatch, and the hollow microbead masterbatch, and improve distribution uniformity of the ceramic powder and the hollow glass microbeads in the polyphenylene ether resin. Proportions and content of the ceramic powder and the hollow glass microbeads are controlled to optimize a stacking and arrangement manner of the ceramic powder and the hollow glass microbeads, to effectively reduce stress concentration between the polyphenylene ether, the ceramic powder, and the hollow glass microbeads. On the basis of maintaining substrate density and a dielectric constant, an stress cracking resistance disadvantage of a radome substrate manufactured by using polyphenylene ether is effectively alleviated.

The present invention provides a lightweight stress cracking resistance polyphenylene ether radome substrate that has a high dielectric constant, to effectively improve stress cracking resistance performance of the polyphenylene ether substrate.

The above technical contents are merely preferred embodiments of the present invention, but are not intended to limit the present invention. Any modification, equivalent replacement, or improvement made within the spirit and principle of the present invention shall fall within the protection scope of the present invention.

What is claimed is:

1. A radome substrate, characterized in that, comprising, based on parts by weight:
   5 to 10 parts of polyphenylene ether resin, 70 to 85 parts of ceramic masterbatch, 10 to 15 parts of hollow microbead masterbatch, 1 to 3 parts of a compatibilizer, and 0.1 to 0.3 parts of a lubricant.

2. The radome substrate according to claim 1, wherein the ceramic masterbatch is obtained by surface-modifying ceramic powder with a coupling agent, mixing the surface-modified ceramic powder with polyphenylene ether, and granulating them; and the ceramic powder comprises one or a combination of rutile $TiO_2$, $BaO_6SrTi_2$, $SrTiO_3$, $BaTiO_3$, and $CaCu_3Ti_4O_{12}$.

3. The radome substrate according to claim 1, wherein the hollow microbead masterbatch is obtained by surface-modifying hollow glass microbeads with a coupling agent, mixing the surface-modified hollow glass microbeads with polyphenylene ether, and granulating them.

4. The radome substrate according to claim 2, wherein the coupling agent comprises one or a combination of γ-aminopropyltriethoxysilane, γ-(2,3-epoxypropoxy), and propyl trimethoxy silane.

5. The radome substrate according to claim 1, wherein the compatibilizer comprises one or a combination of polyphenylene oxide grafted maleic anhydride and polyphenylene oxide grafted glycidyl methacrylate, and a grafting rate of each of the polyphenylene-oxide-grafted-maleic-anhydride and the polyphenylene oxide grafted glycidyl methacrylate is 0.5%-1.0%.

6. The radome substrate according to claim 1, wherein the lubricant comprises one or a combination of glyceryl monostearate, N,N'-ethylene hisstearamide, ethylene bis-stearamide, ethylene stearamide, and polysiloxane.

7. A preparation method of a radome substrate according to claim 1, comprising:
   surface-modifying ceramic powder, uniformly mixing the surface-modified ceramic powder with polyphenylene ether, and granulating them to prepare ceramic masterbatch;
   surface-modifying hollow glass microbeads, uniformly mixing the surface-modified hollow glass microbeads with polyphenylene ether, and granulating them to prepare hollow microbead masterbatch; and
   based on parts by weight, taking 5 to 10 parts of polyphenylene ether resin, 70 to 85 parts of the ceramic masterbatch, 10 to 15 parts of the hollow microbead masterbatch, 1 to 3 parts of a compatibilizer, and 0.1 to 0.3 parts of a lubricant, uniformly mixing them, and hot pressing them to prepare the radome substrate.

8. The preparation method of the radome substrate according to claim 7, wherein in the step of preparing the ceramic masterbatch, using a coupling agent whose weight accounts for 0.3% to 0.5% of a total weight of the ceramic masterbatch to surface-modify the ceramic powder, wherein weights of the surface-modified ceramic powder and the polyphenylene ether respectively account for 80% to 85% and 10% to 20% of the total weight of the ceramic masterbatch; and
   in the step of preparing the hollow microbead masterbatch, using a coupling agent whose weight accounts for 0.3% to 0.5% of a total weight of the hollow microbead masterbatch to surface-modify the hollow glass microbeads, wherein weights of the surface-modified hollow glass microbeads and the polyphenylene ether respectively account for 50% to 55% and 45% to 55% of the total weight of the hollow microbead masterbatch.

9. The preparation method of the radome substrate according to claim 8, wherein the coupling agent comprises one or a combination of γ-aminopropyltriethoxysilane, γ-(2, 3-epoxypropoxy), and propyl trimethoxy silane; the compatibilizer comprises one or a combination of polyphenylene oxide grafted maleic anhydride and polyphenylene oxide grafted glycidyl methacrylate; and the lubricant comprises one or a combination of glyceryl monostearate, N,N'-ethylene hisstearamide, ethylene bis-stearamide, ethylene stearamide, and polysiloxane.

10. The preparation method of the radome substrate according to claim 7, wherein before the step of surface-modifying the ceramic powder, the method further comprises: separately drying the ceramic powder and the polyphenylene ether in an oven at 85° C. to 115° C. for 2 to 3 hours; and
   before the step of surface-modifying the hollow glass microbeads, the method further comprises: separately drying the hollow glass microbeads and the polyphenylene ether in an oven at 85° C. to 115° C. for 2 to 3 hours;

wherein the hot pressing is performed by a hot press machine, the operating temperature of the hot press machine is 230° C. to 280° C., and the operating pressure of the hot press machine is 20 to 50 MPa.

11. The preparation method of the radome substrate according to claim 7, further comprising:

surface-modifying ceramic powder with a coupling agent, mixing the surface-modified ceramic powder with polyphenylene ether, and granulating them, so as to obtain the ceramic masterbatch; wherein the ceramic powder comprises one or a combination of rutile $TiO_2$, $BaO_6SrTi_2$, $SrTiO_3$, $BaTiO_3$, and $CaCu_3Ti_4O_{12}$.

12. The preparation method of the radome substrate according to claim 7, further comprising:

surface-modifying hollow glass microbeads with a coupling agent, mixing the surface-modified hollow glass microbeads with polyphenylene ether, and granulating them, so as to obtain the hollow microbead masterbatch.

13. The preparation method of the radome substrate according to claim 10, wherein the step of separately drying the ceramic powder and the polyphenylene ether in an oven at 85° C. to 115° C. for 2 to 3 hours comprises:

separately drying the ceramic powder and the polyphenylene ether in an oven at 88° C., 90° C., 100° C., or 110° C. for 2 to 3 hours;

wherein the step of separately drying the hollow glass microbeads and the polyphenylene ether in an oven at 85° C. to 115° C. for 2 to 3 hours comprises:

separately drying the hollow glass microbeads and the polyphenylene ether in an oven at 88° C., 90° C., 100° C., or 110° C. for 2 to 3 hours.

14. The preparation method of the radome substrate according to claim 10, wherein the step of separately drying the ceramic powder and the polyphenylene ether in an oven at 85° C. to 115° C. for 2 to 3 hours comprises:

separately drying the ceramic powder and the polyphenylene ether in an oven at 85° C. to 115° C. for 2.5 hours;

wherein the step of separately drying the hollow glass microbeads and the polyphenylene ether in an oven at 85° C. to 115° C. for 2 to 3 hours comprises:

separately drying the hollow glass microbeads and the polyphenylene ether in an oven at 85° C. to 115° C. for 2.5 hours.

15. The preparation method of the radome substrate according to claim 10, wherein the operating temperature of the hot press machine is 240° C., 250° C., 260° C., or 270° C.

16. The preparation method of the radome substrate according to claim 10, wherein the operating pressure of the hot press machine is 30 MPa, 35 MPa, 40 MPa, or 45 MPa.

17. The preparation method of the radome substrate according to claim 8, wherein the step of using a coupling agent whose weight accounts for 0.3% to 0.5% of a total weight of the ceramic masterbatch to surface-modify the ceramic powder comprises:

using a coupling agent whose weight accounts for 0.4% of a total weight of the ceramic masterbatch to surface-modify the ceramic powder.

18. The preparation method of the radome substrate according to claim 8, wherein the step of using a coupling agent whose weight accounts for 0.3% to 0.5% of a total weight of the hollow microbead masterbatch to surface-modify the hollow glass microbeads comprises:

using a coupling agent whose weight accounts for 0.4% of a total weight of the hollow microbead masterbatch to surface-modify the hollow glass microbeads.

19. The preparation method of the radome substrate according to claim 8, wherein the weight of the surface-modified ceramic powder accounts for 82%, 83%, or 84% of the total weight of the ceramic masterbatch;

the weight of the polyphenylene ether accounts for 15%, 16%, 17%, or 18% of the total weight of the ceramic masterbatch.

20. The preparation method of the radome substrate according to claim 8, wherein the weight of the surface-modified hollow glass microbeads accounts for 52%, 53%, or 54% of the total weight of the hollow microbead masterbatch;

the weight of the polyphenylene ether accounts for 46%, 47%, 48%, or 50% of the total weight of the hollow microbead masterbatch.

* * * * *